Feb. 22, 1944.  J. HOJNOWSKI  2,342,514
BOMB RACK FOR AIRCRAFT
Filed Feb. 8, 1941    3 Sheets-Sheet 1
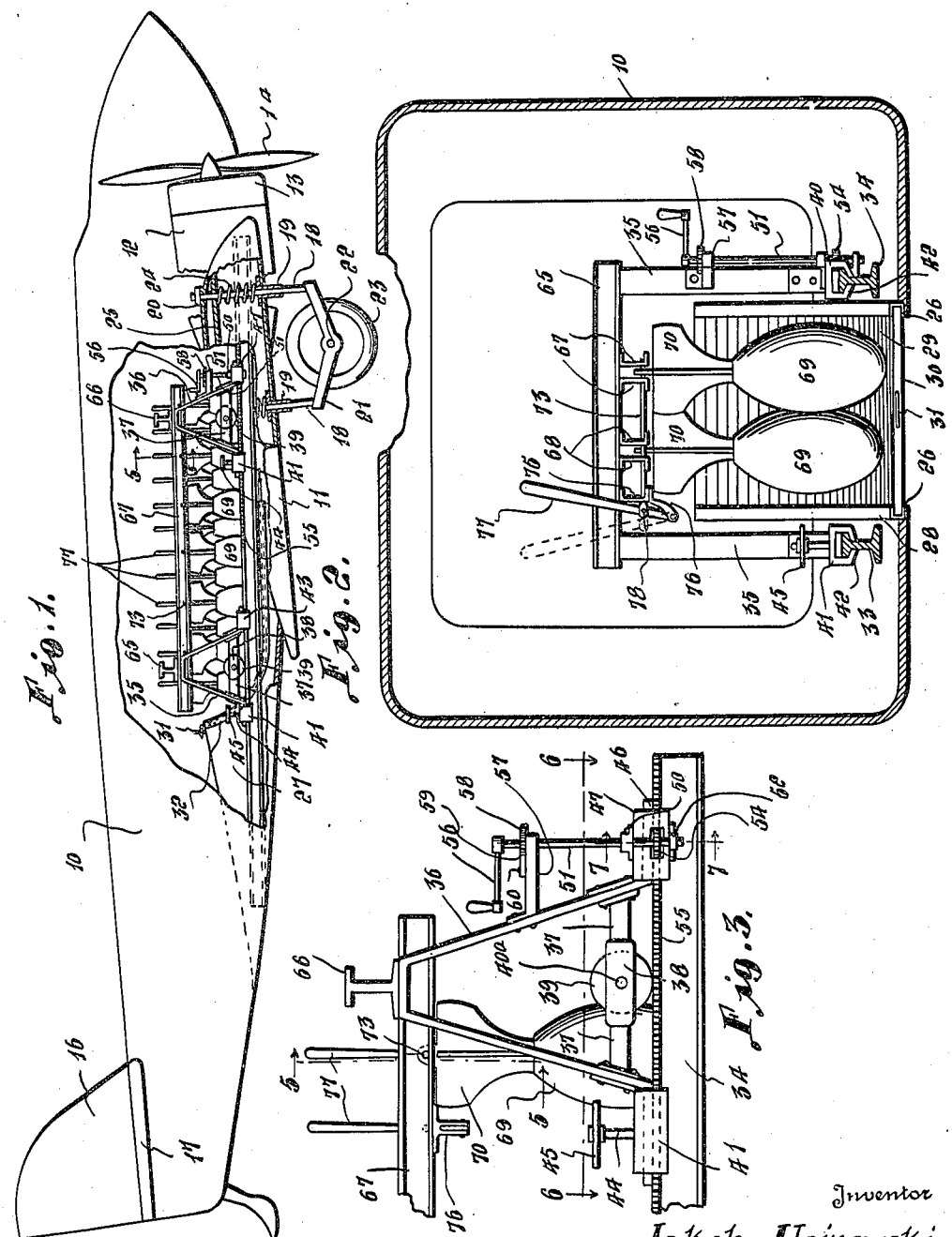
Inventor
Jakob Hojnowski
By
Bryant & Lowey
Attorneys

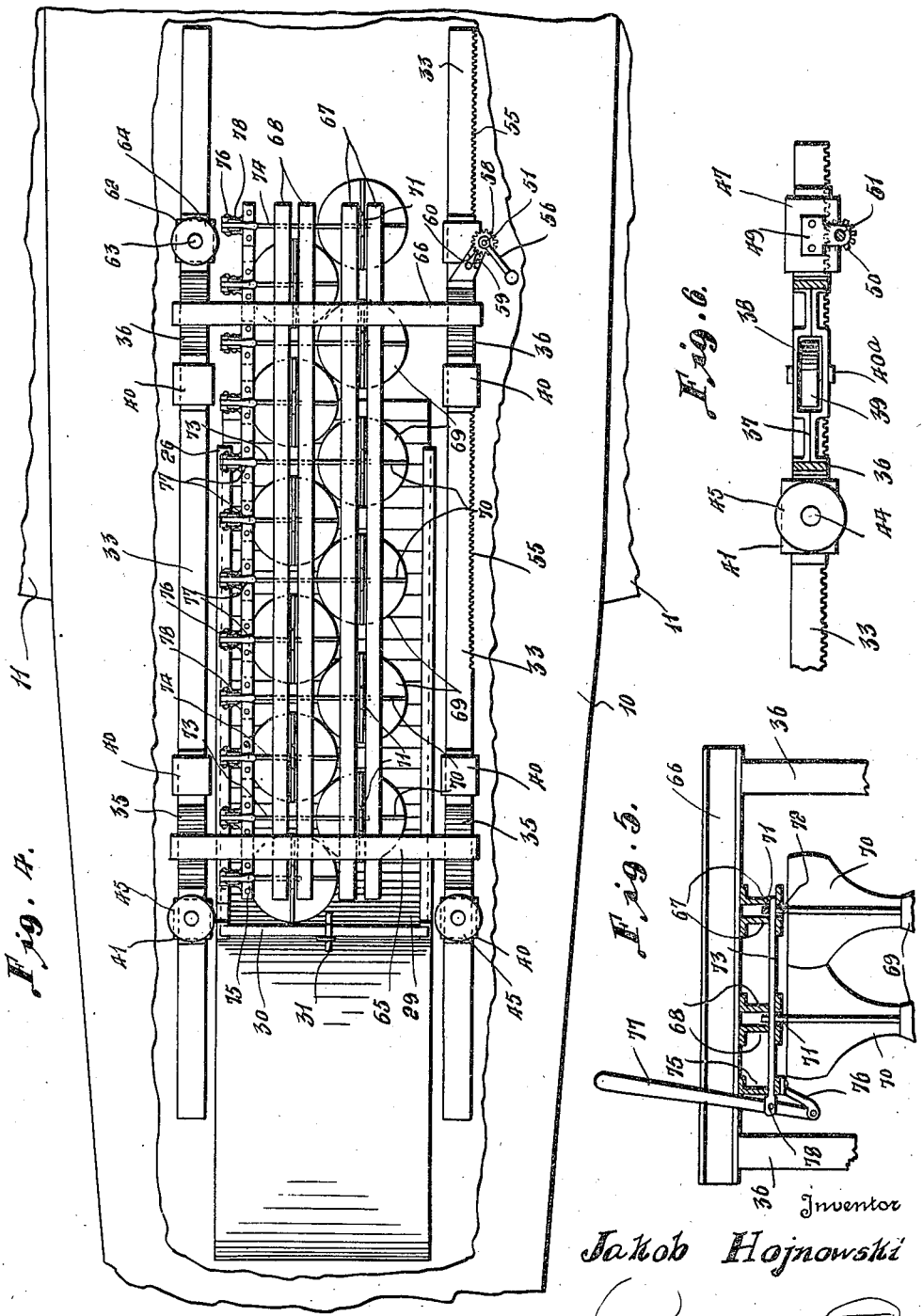

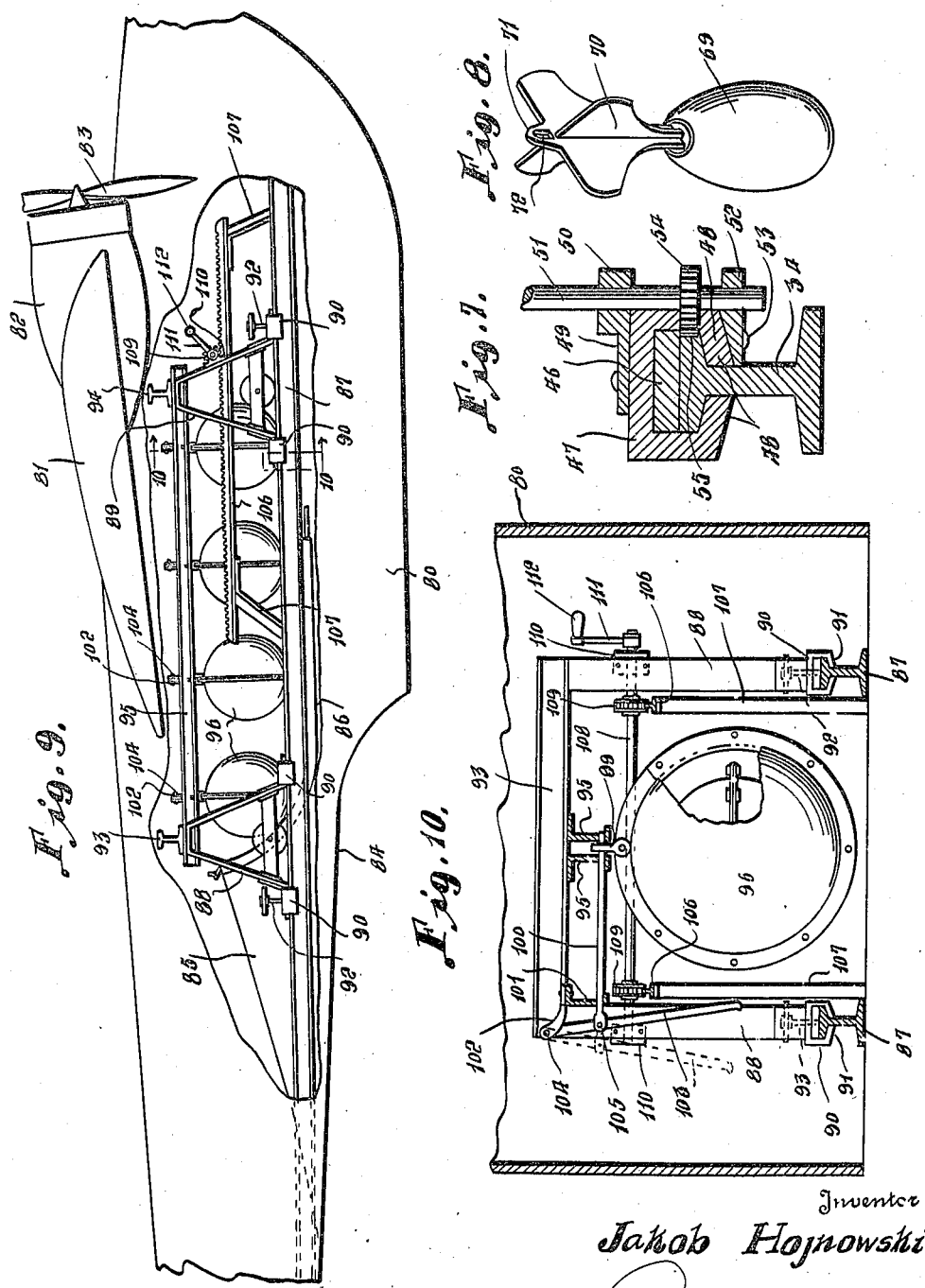

Patented Feb. 22, 1944

2,342,514

UNITED STATES PATENT OFFICE 2,342,514

BOMB RACK FOR AIRCRAFT

Jakob Hojnowski, Nekoosa, Wis.

Application February 8, 1941, Serial No. 378,071

3 Claims. (Cl. 89—1.5)

This invention relates to certain new and useful improvements in bomb racks for aircraft.

The primary object of the invention is to provide a bomb rack which is movably mounted in the fuselage of the aircraft whereby the rack may be shifted longitudinally thereof to position the bombs for discharge.

A further object of the invention is to provide a bomb rack for aircraft of the above mentioned type which may be moved rearwardly over a discharge opening in the aircraft so that the bombs may be discharged successively through a limited opening in the aircraft fuselage.

A further object of the invention is to provide a bomb rack for aircraft which will discharge the bombs from their racks individually in successive order so that greater aim control may be accomplished at higher altitudes.

A still further object of the invention is to provide a bomb rack for aircraft which will hold a number of bombs in suspended relation within the confines of the aircraft fuselage whereby the bombs will be concealed and will be protected against anti-aircraft shrapnel and other bomb missiles.

A still further object of the invention is to provide a bomb rack which is adapted to support a series of bombs within the confines of the aircraft fuselage as to place the bombs out of the slip stream of the aircraft whereby friction and wind resistance will be reduced to a minimum.

A still further object of the invention is to provide a bomb rack for aircraft whereby the bombs may be suspended in the fuselage of the aircraft instead of adjacent the wings and landing gear so that the bombs may be transported in flight without the possibility of damage from bomb explosions during landing and take-off operations.

Other objects and advantages of the invention will become apparent during the course of the following description, taken with the drawings, wherein, in the drawings—

Figure 1 is a fragmentary side elevational view of an aircraft illustrating the fuselage broken away to indicate the position of the bomb rack and detailed construction;

Figure 2 is an enlarged cross-sectional view illustrating the bomb rack in end elevation and showing the manner in which the bombs are suspended therefrom in staggered relation;

Figure 3 is an enlarged fragmentary side elevational view illustrating in detail one end of the bomb rack and showing the manner in which the same is shifted longitudinally of the aircraft fuselage;

Figure 4 is a top plan view of the bomb rack illustrating the aircraft fuselage broken away to more clearly illustrate the location thereof;

Figure 5 is a fragmentary vertical cross-sectional view taken on line 5—5 of Figure 3, looking in the direction of the arrows, illustrating in detail the bomb suspension means and the manual discharge lever therefor;

Figure 6 is a longitudinal cross-sectional view taken on line 6—6 of Figure 3, looking in the direction of the arrows, further illustrating in detail the bomb rack shifting mechanism;

Figure 7 is a vertical cross-sectional view taken on line 7—7 of Figure 3, looking in the direction of the arrows, showing the gear and rack connection for the bomb rack and supporting track;

Figure 8 is a perspective view of a bomb illustrating the tail provided with a loop for suspension purposes in accordance with the bomb rack;

Figure 9 is a fragmentary side elevational view of a modified form of the invention; and Figure 10 is a vertical cross-sectional view taken on line 10—10 of Figure 9, looking in the direction of the arrows, illustrating in detail a modified construction.

In the drawings, wherein for the purpose of illustrating the invention and wherein like reference characters will be employed to designate like parts throughout the same, attention is directed first to Figures 1 to 8 inclusive wherein the reference character 10 will generally be employed to designate the fuselage of an airplane or other aircraft of the bomber type. The airplane is provided with the usual wings 11 which carry motor supports 12 having motors 13 for driving the propellers 14. A rudder 16 is provided on the tail of the fuselage and the usual elevators 17 extend outwardly from opposite sides thereof.

Suitable landing gear is carried by each wing 11 and comprises a pair of spaced rods 18 which are slidably mounted in sleeves 19 formed on the underside of the wings. The upper ends of the rods extend through the wings and are provided with nuts or the like 20. The rods 18 are connected by a yoke 21 adapted to carry an axle 22 upon which is supported suitable landing wheels 23. Coil springs 24 encircle the rods 18 and have one end abutting a plate 25, while the opposite end is attached to the slide rods 18.

The bottom wall of the fuselage 10 is provided with an opening 26 and is indented to provide a recessed portion 27 so that the inner end of the indentation 27 will communicate with the opening 26 as a continuation thereof.

Extending along the edge of the opening 26 is a trackway 28 for the purpose of slidably receiving a flexible traversing door 29 having an end bar 30 provided with an operating handle 31. By sliding the traversing door 29 downwardly and rearwardly about the curved portion 32, an opening will be formed in the lower portion of the fuselage communicating with the recessed portion 27.

Supported on the floor of the fuselage 10 is a pair of longitudinally extending I-beams 33 and 34 mounted on opposite sides of the opening 26 and extending forwardly of the fuselage toward the nose of the plane.

Slidably mounted upon each of the I-beams 33 and 34 is a pair of supporting trestles 35 and 36 which are braced at their lower ends by means of complementary bracing plates 37, the ends of which are attached as by welding or the like to the vertical standards of the trestle. The brace plates 37 are provided with opposed depressions 38 for receiving a roller 39 mounted on a suitable spindle or pin 40. The rollers 39 are adapted to engage the upper surface of the I-beams 33 and 34 for supporting the trestles 36 intermediate the ends thereof. The trestles 35 and 36 are provided at the rear portions thereof with a guide block 41 which rests on the tread of the I-beam and has its lower edges bent thereunder as at 42 to retain the trestles in place. The rear trestles 35 are provided at their forward ends with guide blocks 43 which are similar to the guide blocks 41 and are provided with inwardly directed flanges on the lower portion thereof for underlying the tread of the I-beams 33 and 34.

The rear guide blocks 41 are adapted to threadedly receive a rod 44 having an operating handle 45 so that rotation of the handle will cause the rod 44 to move into engagement with the tread of the I-beams and lock the trestles in place.

Mounted on the forwardly extending portion 46 of one of the trestles 36 is a guide block 47 having underturned flanges 48 for engaging the tread of the I-beam 34. Mounted on the top of the guide block 47 is a plate 49 having a boss 50 forming an upper bearing for a rotary shaft 51. The lower end of the rotary shaft 51 is journalled in a bearing member 52 secured to the inwardly turned flange 48 of the guide block as by means of a rivet or the like 53.

Keyed to the shaft 51 is a gear wheel 54 adapted to mesh with rack teeth 55 formed on the edge portion of the I-beam tread 34 so that rotation of the shaft 51 as by means of a hand crank 56 will move the trestles 36 forwardly and rearwardly of the fuselage. Secured to the trestle 36 is a forwardly projecting arm 57 through which the upper end of the shaft 51 extends so that the same will be adequately supported thereon and a ratchet wheel 58 is keyed to the upper end of the shaft and is adapted to be engaged by a pawl 59 pivotally attached to the arm 57 as at 60. The opposite trestle 36 is provided with a guide block 62 which is similar in construction to the guide blocks 40 and 41 and is provided with a screw threaded shaft 63 which extends therethrough and is adapted to have its ends engage the tread of the I-beam 33 so that rotation of the hand wheel 64 may lock the trestle in position similar to the hand wheels 45.

Connecting the pair of trestles 35 is a transverse I-beam 65 and similarly, the trestles 36 are connected by a transverse I-beam 66. The I-beams 65 and 66 are connected by longitudinal channel irons 67 and 68 and it is to be noted that the channel irons 67 have their flanges arranged in opposed relation and likewise, the channel irons 68 are arranged so that their flanges extend in opposite directions. The channel irons 67 and 68 are arranged in spaced relation so that bombs 69 may have their tails 70 supported thereby and as shown in Figure 8, the bombs 69 are provided with an extension 71 having an aperture 72 so that the extension may extend upwardly between the pairs of channel irons 67 and 68 and be held in place by rods 73 and 74. The rods 73 are adapted to support the bombs held suspended between the pair of channel irons 67 while the shorter rods 74 are adapted to support the bombs suspended between the pair of channel irons 68.

A channel iron 75 has its ends welded or otherwise connected to the transverse I-beams 65 and 66 and carries a series of brackets 76 arranged in spaced relation thereon to which is pivoted manual operating means 77 adapted to be pivotally attached to the rods 73 and 74 as at 78. The manual operating levers 77 are all identical and alternately connect with the long and short suspension rods 73 and 74.

In operation, the flexible door 29 is moved by its handle 31 to an open position so that the opening 26 will be uncovered and communication is had with the indented portion of the fuselage body 27. The operating handle 56 is rotated after the hand wheels 45 and 64 have been operated to release the slide blocks of the trestles 35 and 36 so that the bomb rack and bombs may be moved rearwardly to present the bombs to the opening in staggered succession. The bomber then operates the manual control lever 77 supporting the bomb nearest the opening after the correct bomb sight has been given by manipulation of the bomb sight.

The bombs are thus discharged individually in an accurate and efficient manner.

In the modified form of the invention, shown in Figs. 9 and 10, the reference character 80 will generally be employed to designate an aircraft fuselage having the usual air foils 81, motors 82 for driving a propeller 83. The rear portion of the fuselage is undercut as at 84 and is further recessed by an inclined wall 85 opening at its forward end into the fuselage body. A slide closure 86 is provided for closing said opening during normal flight.

The bomb rack comprises a pair of longitudinally extending I-beams 87 mounted on each side of the opening and extending forwardly in the fuselage body and slidably mounted on the I-beams is a pair of rear trestle frames 88 and a pair of front trestle frames 89. The trestle frames are provided at their foot portions with guide blocks 90 which are welded or otherwise secured to the foot portion and are provided with flanges 91 underlying the tread of the I-beams.

Locking screws 92 may be inserted in certain of the guide blocks 90 to lock the guide blocks to the I-beams after the bomb rack has been adjusted.

The trestle frames 88 are connected by a transverse I-beam 93 while the trestle frames 89 are connected by a transverse I-beam 94. Suspended beneath and between the I-beams 93 and 94 are channel bars 95 arranged in spaced relation so that their flanges extend in opposite directions. Bombs 96 are provided with suspension loops 99 which are adapted to extend between the channel beams so that a slide rod 100 may pass through the channel beams and loop 99 and support the bomb 96 in suspended relation.

Also connected to the transverse I-beams 93 and 94 is a channel iron 101 having a series of spaced brackets 102 secured thereto to which is pivoted a manual operating lever 103 as at 104. The slide rod 100 is pivotally attached to the manual operating lever 103 as at 105.

The bomb rack is adjusted forwardly and rearwardly of the fuselage on the guide block 90 and the means for effecting such adjustments includes a rack bar 106 supported at its ends by brackets 107 which are adapted to hold the rack bar 106 in spaced parallel relation on opposite sides of the bomb rack.

Journalled in suitable bearings carried by the trestle frames 89 is a rotary shaft 108 having gear wheels 109 at each end thereof for engaging the rack teeth of the rack bar 106 and said rotary shaft has its ends suitably journalled in bearings 110 anchored in place by rivets or the like. Mounted on one end of the rotary shaft 108 is a crank arm 111 having a handle 112 to facilitate rotation of the operating shaft and cause the forward or rearward movement of the bomb rack with relation to the slide opening 86 after which the guide blocks 90 may be locked in position by operation of the locking screws 92.

The operation of the modified form of the invention is substantially identical to the form shown in Figures 1 to 8 inclusive and by merely operating a hand crank 112, the bomb rack may be adjusted so that the bombs 96 will be discharged through the opening 86 individually.

It is to be understood, that the forms of the invention herewith shown and described are to be taken as preferred examples of the same and that various changes in the shape, size and arrangement of parts may be resorted to without departing from the spirit of the invention or the scope of the subjoined claims.

I claim:

1. In a bomb rack for aircraft, wherein the aircraft has a bottom opening therein to facilitate the charging of the rack with bombs and the discharge of the bombs from the rack, track rails in the aircraft at opposite sides of the opening, a bomb rack shiftably mounted on the track rails and movable thereon to discharge bombs through the aircraft opening, rack and pinion devices associated with the bomb rack and track rails for shifting the bomb rack and manually operated means carried by a part of the rack engageable with the rails for holding the bomb rack anchored relative to the track rails, the mounting of the bomb rack on the track rails including inverted V-shaped legs supporting the bomb rack at their upper ends, guide straps at the lower ends of the legs slidable on the rails and bearing wheels between the legs riding on the rails.

2. In a bomb rack for aircraft, wherein the aircraft has a bottom opening therein to facilitate the charging of the rack with bombs and the discharge of the bombs from the rack, track rails in the aircraft at opposite sides of the opening, a bomb rack shiftably mounted on the track rails and movable thereon to discharge bombs through the aircraft opening, rack and pinion devices associated with the bomb rack and track rails for shifting the bomb rack and manually operated means carried by a part of the rack engageable with the rails for holding the bomb rack anchored relative to the track rails, the rack and pinion devices comprising a rack bar above the track rails and the pinion being supported on the bomb rack, the mounting of the bomb rack on the track rails including inverted V-shaped legs supporting the bomb rack at their upper ends, guide straps at the lower ends of the legs slidable on the rails and bearing wheels between the legs riding on the rails.

3. In a bomb rack for aircraft, wherein the aircraft has a bottom opening therein to facilitate the charging of the rack with bombs and the discharge of the bombs from the rack, track rails in the aircraft at opposite sides of the opening, a bomb rack shiftably mounted on the track rails and movable thereon to discharge bombs through the aircraft opening, rack and pinion devices associated with the bomb rack and track rails for shifting the bomb rack and manually operated means carried by a part of the rack and engageable with the rails for holding the bomb rack anchored relative to the track rails, the rack and pinion devices comprising rack teeth on the track rails and the pinion being supported on the bomb rack, the mounting of the bomb rack on the track rails including inverted V-shaped legs supporting the bomb rack at their upper ends, guide straps at the lower ends of the legs slidable on the rails and bearing wheels between the legs riding on the rails.

JAKOB HOJNOWKI.